June 8, 1965 H. T. JOHNSTON 3,188,094
DRY FERTILIZER SPREADER
Filed June 24, 1963 4 Sheets-Sheet 1

INVENTOR.
HOWARD T. JOHNSTON
BY
Lothrop & West
ATTORNEYS

June 8, 1965　　　　H. T. JOHNSTON　　　　3,188,094
DRY FERTILIZER SPREADER
Filed June 24, 1963　　　　　　　　　　　　　　4 Sheets-Sheet 2

INVENTOR.
HOWARD T. JOHNSTON
BY
Lothrop & West
ATTORNEYS

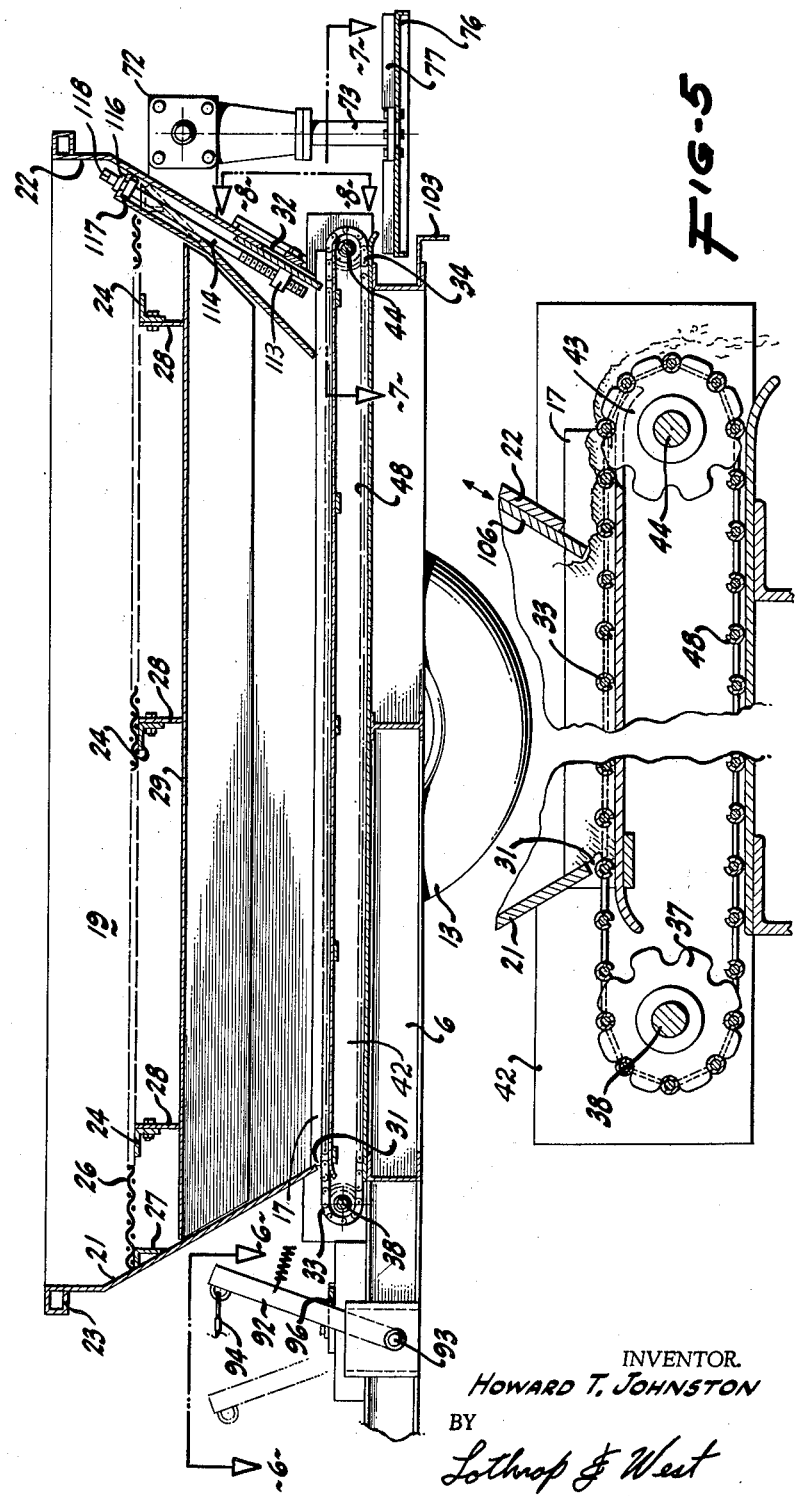

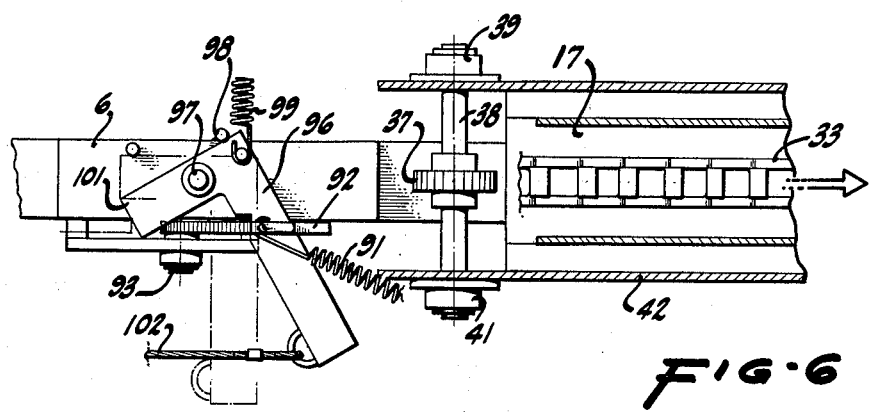
FIG·6
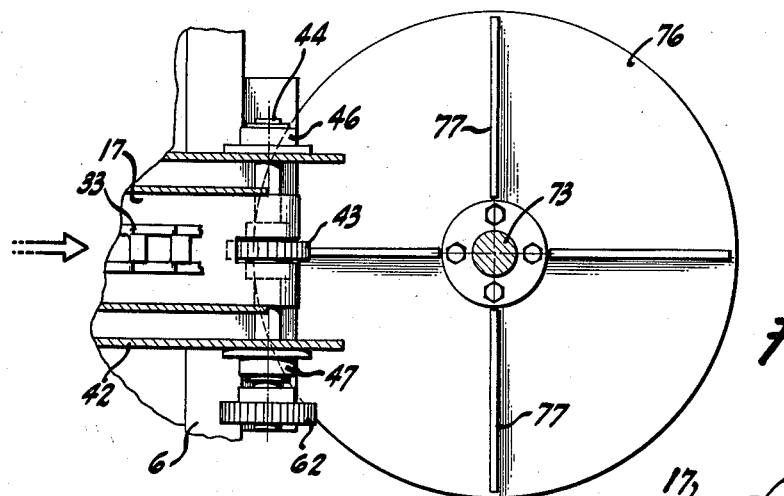
FIG·7
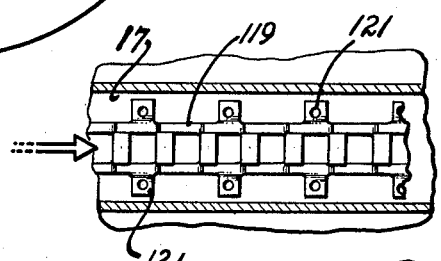
FIG·9
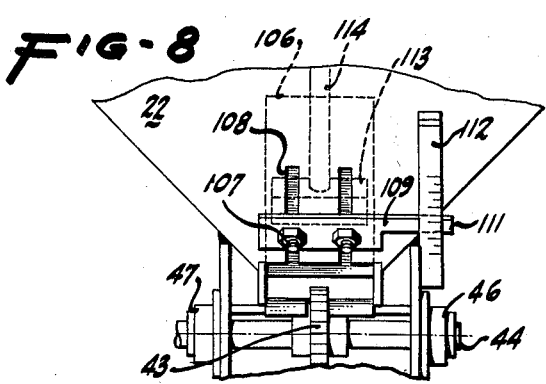
FIG·8
INVENTOR.
HOWARD T. JOHNSTON
BY
Lothrop & West
ATTORNEYS

United States Patent Office 3,188,094
Patented June 8, 1965

3,188,094
DRY FERTILIZER SPREADER
Howard T. Johnston, P.O. Box 588, Yuba City, Calif.
Filed June 24, 1963, Ser. No. 289,911
1 Claim. (Cl. 275—6)

My invention relates to a farming implement especially designed for propulsion by a coupled tractor for spreading dry fertilizer over a field.

It is an object of the invention to provide a dry fertilizer spreader which can readily be attached to and drawn by a tractor of the sort normally available on a farm.

Another object of the invention is to provide a dry fertilizer spreader which effectuates a mechanical distribution of a load of fertilizer and is driven indirectly by the tractor power.

Another object of the invention is to provide a dry fertilizer spreader under the control of the tractor operator at all times.

Another object of the invention is to provide a dry fertilizer spreader which can readily be loaded with dry fertilizer from a bulk bin and which can then be operated to spread the fertilizer accurately while the machine is advancing.

A still further object of the invention is to provide a dry fertilizer spreader that is susceptible to regulation as to the amount of fertilizer spread.

A still further object of the invention is to provide an improved dry fertilizer spreader.

Other objects of the invention together with the foregoing are attained in the embodiment of the invention described in the accompanying description and illustrated in the accompanying drawings, in which:

FIGURE 4 is a longitudinal cross section, the plane of which is indicated by the line 4—4 of FIGURE 2;

FIGURE 5 is an enlarged detail in cross section of part of the conveyor mechanism, a portion being broken away to reduce the size of the figure;

FIGURE 6 is a plan and cross section of a forward part of the mechanism, the view being taken as indicated by the line 6—6 of FIGURE 4;

FIGURE 7 is a cross section, the plane of which is indicated by the line 7—7 of FIGURE 4;

FIGURE 8 is a detail in elevation, the figure being taken as indicated by the line 8—8 of FIGURE 4; and FIGURE 9 is a plan with parts in section showing a modified form of conveyor chain for use in the dry fertilizer spreader.

Figure 3:
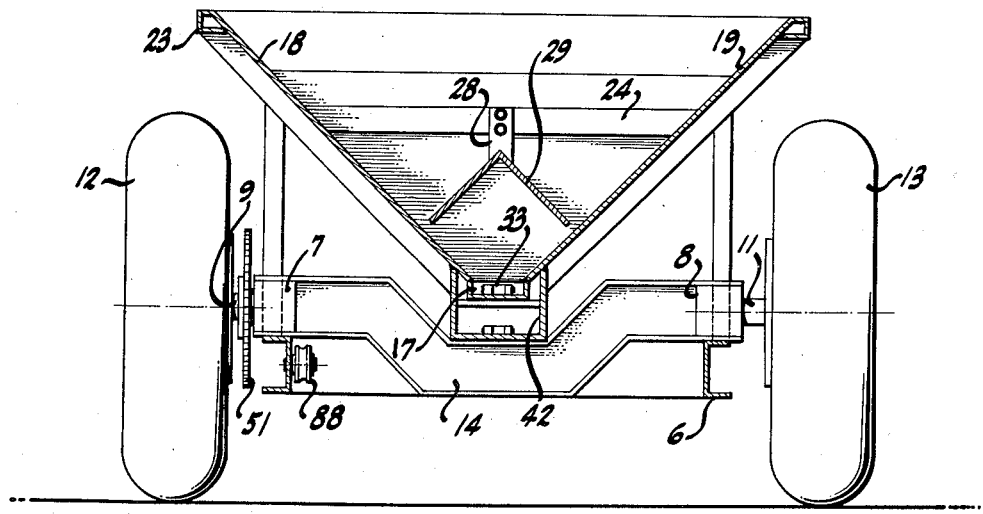
FIGURE 3 is a cross section, the plane of which is indicated by the line 3—3 of FIGURE 1.

In the preferred embodiment of the invention, the spreader includes a draft frame 6 which is designed at its forward end for connection to the draft hitch of the customary farm tractor (not shown), so that the tractor serves as part of the support for the draft frame 6. The frame is made up of a plurality of channels and structural shapes in the customary way and affords a base of attachment and support for the remainder of the body structure. Adjacent its center, the draft frame affords attachments for a pair of journal boxes 7 and 8 (FIGURE 3) from each of which extends a live axle 9 and 11 serving as supports for ground-engaging wheels 12 and 13, the frame being stiffened by a transverse, dead axle reinforcement 14.

Extending longitudinally of the draft frame 6 is an open-top trough 17 which is substantially rectangular in plan and approximately U-shaped in cross sectional contour. Converging downwardly to the side walls of the trough 17 are side walls 18 and 19 as well as end walls 21 and 22 all together constituting an open-top bin having a rim reinforcement 23. Extending transversely across the bin between the side walls 18 and 19 are angle beams 24. Each of these serves as a support for a generally horizontal screen 26 spanning substantially the entire area of the bin. End ledges 27 assist in supporting the screen ends. Depending from the angle beams 24 are straps 28 from which a deflector 29 depends. The deflector is a peaked, dihedral longitudinal member overlying the trough 17 and spaced therefrom as well as from the sides of the bin.

The end walls 21 and 22 of the bin have openings 31 and 32 therein not only to pass end portions of the trough, but also to pass the upper run 33 of a conveyor 34. This is conveniently a link chain at its forward end trained around a sprocket 37 on a shaft 38 carried by journals 39 and 41 in the side walls of a channel 42 parallel to and underlying the trough 17 and also serving as a frame member. At its rear end the conveyor 34 is trained around a sprocket 43 on a shaft 44 carried in bearings 46 and 47 supported by the extended end of the channel 42. The lower return run 48 of the conveyor travels on the cross web of the channel 42.

Figure 2:
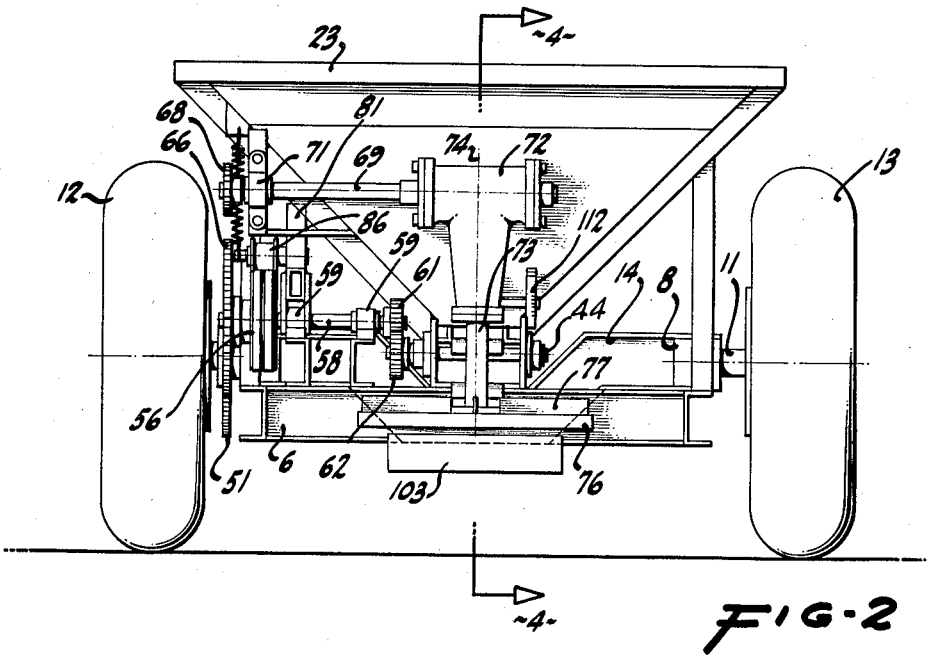
FIGURE 2 is a rear end elevation of the dry fertilizer spreader.

Means are provided for appropriately driving the conveyor 34 as the draft frame advances. Power is preferably taken from one of the ground-engaging wheels so that indirectly the propelling tractor furnishes the power to operate the fertilizer spreader without the use of a power take-off or other direct mechanical connection. For that reason, the live axle 9 of the wheel 12, for example, carries a driving sprocket 50 connected by a chain 51 to a sprocket 52 on a drive shaft 53 appropriately journalled on the machine frame 6 and also carrying a plurality of belt pulleys 54. Encompassing the pulleys 54 and extending loosely, under normal conditions, around a similar set of pulleys 56 are driving belts 57. The pulleys 56 are mounted on a driven shaft 58 (FIGURE 2) carried in journals 59 on the draft frame. The driven shaft 58 at its inboard end carries a spur gear 61 meshing with a comparable spur gear 62 on the cross shaft 44 which carries the sprocket 43.

On the outboard end of the driven shaft 58 there is provided a chain sprocket 66 connected by a chain 67 to a driven sprocket 68. A shaft 69 carrying the sprocket 68, is held in a steady bearing 71, and is also carried in a gear housing 72 secured to the rear end wall 22. Within the housing 72 are a bevel gear drive and appropriate bearing mountings (not shown) coupling the shaft 69 to a shaft 73 designed to revolve about a vertical axis 74. At its lower end the shaft 73 carries a spreader disc 76 having a plurality of radial vanes 77 thereon. The disc is so located as at least in part to underlie the rearward end of the trough 17 and to underlie the rear terminus of the upper run of the conveyor chain. As shown in the drawings, the diameter of the spreader disc 76 is preferably at least four times the transverse dimensions of the conveyor chain 34.

Pursuant to the invention, means are provided for leaving the belts 57 slack or loose so that they do not transmit any driving effort to the driven shaft 58, or for tensioning the belts so that driving effort is transmitted to the driven shaft 58 in order that both the spreader disc 76 and the conveyor 34 can be appropriately and simultaneously operated.

For that reason, there is journalled on the shaft 58 a lever arm 81 normally retracted by means of a spring 82. One end of the spring is secured to a bracket 83 on the side wall of the bin, and at the other end is secured to a stub shaft 84 projecting from the lever 81. Journalled on the stub shaft is a belt idler 86. When only the spring 82 is effective, the lever 81 is held in an uppermost position and the idler 86, being free of the belts, does not tension them and no drive is transmitted by them. In order to make the drive effective, the spring is overcome by a manually controlled means. A cable 87 at one end is connected to the forward end of the lever 81, is trained around idler pulleys 88 and 89 on the frame, and is connected through a tension spring 91 to an actuating lever 92. At its lower end the lever 92 is connected by a pivot 93 to the draft frame 6. A tug line 94 extends from the lever 92 forwardly to the operator on the draft tractor. When the tug line 94 is tensioned, the lever 92 is swung forwardly, the spring 91 is tensioned, and the cable 87 is moved to lower the lever 81 and thus to make the idler 86 engage and tension the belts.

Figure 1:
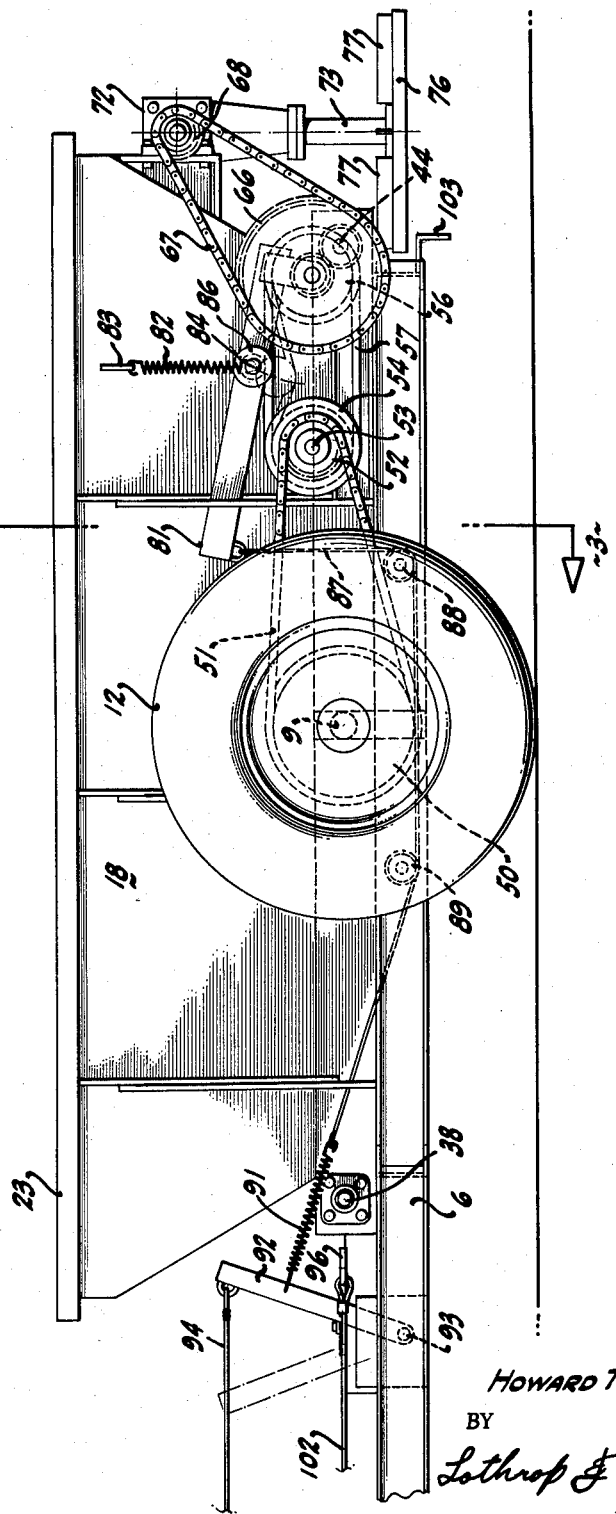
FIGURE 1 is a side elevation of a fertilizer spreader constructed pursuant to my invention.

In order to hold the lever 92 forwardly during protracted operations, a latch lever 96 is provided on the draft frame 6, as shown in FIGURE 6. The lever 96 is mounted to rotate on a pin 97 upstanding from the draft frame 6 and normally urged against a stop 98 by a spring 99. The latch lever 96 has a projection 101 which, when the spring 99 is solely effective, lies in the path of forward movement of the lever 92. Thus, as the lever 92 is swung forwardly into its dotted line position as seen in FIGURES 1 and 6, the projection 101 is momentarily swung to one side and permits the lever 92 to pass forwardly. Immediately thereafter, the spring 99 is effective to restore the projection 101 to its former location and rearwardly of and in the return path of the forward lever 92. Thus the tug line 94, once having been fully actuated, can be released and the lever 92 is still held in its forward, driving position. To release the lever 92, a second tug line 102 is actuated. This is controlled by the operator and extends to the lever 96. When the tug line 102 is pulled forwardly, the lever 96 is swung about the pivot pin 97 and the extension 101 is removed from behind the lever 92. This lever 92 then returns due to the tension of the spring 91 and the drive is disengaged and the parts are restored to their original condition pending subsequent use.

In the operation of this mechanism, the tractor draws the draft frame 6 to a convenient point for loading. The dry fertilizer, usually in bulk bins at an elevation slightly above that of the reinforcing rim 23, is released to fall through the screen 26, being thus appropriately sized for subsequent use. Any debris is retained behind on the screen. The fertilizer can be loaded to a level considerably above the screen 26, but eventually must pass through the screen in order to be used. The fertilizer falls down over the deflector 29 and travels into the bottom portion of the bin and into the trough 17.

When the tractor is then started and the draft frame 6 is advanced, and when the tug line 94 is pulled to advance the lever 92 and latch it in position, the idler 86 tightens the drive belts 57 so that the advancing rotation of the ground-engaging wheel 12 transmits rotation to the drive shaft 58. The conveyor is thus driven so that the upper run 33 travels rearwardly and carries fertilizer from the bin and trough through the opening 32. Simultaneously, the spreader disc 76 is rotated so that fertilizer discharging from the terminus of the conveyor onto the disc is centrifugally distributed over a wide area. Guard plates 103 assist in distributing the fertilizer without having it clog the machinery. Whenever it is desired to stop the spreading action, the second tug line 102 is pulled and the lever 92 is restored to its position to slacken or release the belt drive. The driven shaft then stops and the conveyor and spreader disc likewise stop.

While it is often possible to set the machine in advance to distribute fertilizer at the correct rate, it is possible also to vary the rate of spreading by varying the net size of the opening 32. For that reason, as particularly shown in FIGURES 4 and 8, the rear end wall 22 of the bin is provided with a sliding gate 106 constrained in its motion by a pair of bolts 107 passing through slots 108 in the rear end wall 22 and exteriorly engaging a cross plate 109. An extension 111 travels near a gauge strip 112 so that the location of the gate can be read. Interiorly, the gate is provided with a screw block 113 with which the threaded end of an adjusting bolt 114 is engaged. At its upper end the bolt has collars 116 on opposite sides of a perforated support plate 117 extending inwardly from the rear end wall 22. The upper end of the bolt 114 has a noncircular end 118 for the reception of an appropriate tool. When the tool is engaged with the bolt 114 and is rotated in the appropriate direction, the block 113 and the gate 106 are simultaneously raised or lowered so that the net area of the opening 32 is varied.

For most dry fertilizers a conveyor 34 of simple chain links is effective, but in some instances a conveyor chain 119 (FIGURE 9) having side tabs 121 is used more completely to sweep the bottom of the trough 17.

What is claimed is:

A draft operated, dry fertilizer spreader, comprising: a body having a draft connection rigid therewith, said body including a bin having downwardly and inwardly converging side walls terminating in a longitudinal trough, ground engaging wheels supporting said body for draft movement; a transversely disposed drive shaft rotatably mounted on said body; endless chain and sprocket means connecting said drive shaft and one of said ground engaging wheels for rotating said drive shaft in timed relation with said one wheel upon draft movement of said spreader; a chain conveyor disposed in said trough for discharging said fertilizer through an outlet opening formed in said bin at one end of said trough; a horizontal spreader disc rotatably mounted on said body below said outlet opening, said spreader disc having a diameter predetermined with respect to the transverse dimension of said chain conveyor and being at least four times said transverse dimension; a driven shaft rotatably mounted on said body parallel to and spaced from said drive shaft; chain and sprocket drive means at one end of said driven shaft connecting said spreader disc and said driven shaft for rotating said spreader disc in timed relation with said driven shaft; intermeshing gear drive means at the other end of said driven shaft connecting said driven shaft and said conveyor for driving said conveyor in timed relation with said driven shaft to discharge said fertilizer from said outlet opening onto said spreader disc; first pulley means fixedly secured to said drive shaft for rotation therewith, second pulley means fixedly secured to said one end of said driven shaft for rotation therewith; drive belt means extending over said first and second pulley means; said drive belt means being normally sufficiently slack to permit said drive shaft to rotate without transmitting rotary movement through said drive belt means to said driven shaft; belt tensioning means mounted on said body and engageable with said drive belt means; said belt tensioning means being pivotally mounted on said body for movement between a projected position in engagement with said drive belt means tensioning said drive belt means sufficiently to transmit rotary movement from said drive shaft to said driven shaft and a retracted position wherein said drive belt means is slack, and the drive between the drive shaft and the driven shaft is disengaged; resilient means biasing said belt tensioning means to said retracted position; means connected with said belt tensioning means and movable from a first to a second position for moving said belt tensioning means from said retracted position to said projected position; said latter means including a lever pivoted on the body, a tension spring and cable means interconnecting the lever and the belt tensioning means; and latch means engageable with said pivoted lever for releasably securing said pivoted lever in said second position, the tension spring returning the lever to its first position and disengaging the drive between the drive shaft and the driven shaft when the latch means is released.

References Cited by the Examiner

UNITED STATES PATENTS

| | | | |
|---|---|---|---|
| 690,913 | 1/02 | Albertson | 275—25 |
| 1,880,155 | 9/32 | Ruth | 275—8 |
| 2,799,510 | 7/57 | Schmidt | 275—8 |
| 3,085,807 | 4/63 | Tyler | 275—8 |
| 3,097,851 | 7/63 | Cohrs et al. | 275—6 X |

FOREIGN PATENTS 20,773    12/89    Great Britain.

ABRAHAM G. STONE, *Primary Examiner.*

WILLIAM A. SMITH III, *Examiner.*